Figure 1:
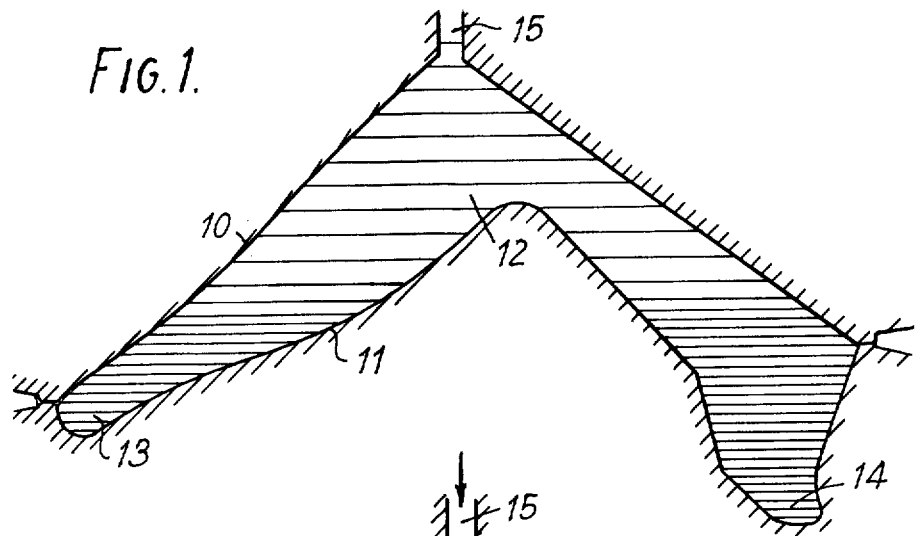

United States Patent
Cotterell

[11] 3,919,370
[45] Nov. 11, 1975

[54] MOULDING HEAT EXPANDABLE THERMOPLASTIC MATERIAL

[75] Inventor: Robert Frederick Joseph Cotterell, Quarndon, England

[73] Assignee: Profile Expanded Plastics Limited, England

[22] Filed: July 17, 1973

[21] Appl. No.: 379,926

[30] Foreign Application Priority Data
July 21, 1972 United Kingdom............ 34307/72

[52] U.S. Cl. ............. 264/45.4; 209/498; 264/51; 264/113; 264/126; 264/DIG. 10; 297/DIG. 2; 425/817; 428/159; 428/305; 428/310
[51] Int. Cl.² ............................................ B29D 27/00
[58] Field of Search ........ 264/46, DIG. 10, 45, 113, 264/126, 45.4; 209/493, 498; 249/205; 164/134; 428/159, 305, 310; 425/817; 297/DIG. 2

[56] References Cited
UNITED STATES PATENTS

| | | | |
|---|---|---|---|
| 2,335,385 | 11/1943 | Bradley | 164/134 |
| 2,644,583 | 7/1953 | Cannon et al. | 209/493 X |
| 2,875,898 | 3/1959 | Spencer | 209/493 X |
| 2,902,154 | 9/1959 | Cannon | 209/493 X |
| 2,954,589 | 10/1960 | Brown | 264/46 |
| 2,983,963 | 5/1961 | Jodell et al. | 264/46 |
| 3,043,627 | 7/1962 | Torjusen | 264/46 X |
| 3,088,713 | 5/1963 | Gard | 264/DIG. 10 |
| 3,112,987 | 12/1963 | Griffiths et al. | 264/45 |
| 3,472,379 | 10/1969 | Lainas et al. | 209/493 X |
| 3,730,252 | 5/1973 | Schnurrenberger | 249/205 X |

FOREIGN PATENTS OR APPLICATIONS

| | | | |
|---|---|---|---|
| 670,830 | 9/1963 | Canada | 264/46 |
| 1,326,192 | 8/1973 | United Kingdom | 264/46 |

*Primary Examiner*—Philip Anderson

[57] ABSTRACT

A method of filling a mould with heat expandable beads of polystyrene arranged in a plurality of layers of different density, so that when the mould is heated to fuse the beads, the parts having the greatest density are stronger than the remainder of the article. The mould is provided internally with a vertical baffle plate mounted on the bottom of the mould directly below the filler opening and arranged so that beads fed through the filler opening are divided by the baffle into two streams which are deflected by the baffle plate in different directions towards different parts of the mould. The beads are drawn from two hoppers, one containing beads of high density and the other containing beads of low density, and the beads for a layer at an intermediate density are drawn simultaneously from both hoppers and mixed together before being fed into the mould. During the filling operation, the proportion of beads from the two hoppers is progressively varied to vary the average density of the beads entering the mould and form the desired density pattern within the mould. The baffle plate is withdrawn through a slot in the bottom of the mould before the mould is heated.

4 Claims, 4 Drawing Figures

MOULDING HEAT EXPANDABLE THERMOPLASTIC MATERIAL

This invention relates to the moulding of heat expandable thermoplastic material, for example expandable polystyrene, and is concerned more particularly with a method of filling a mould with thermoplastic material arranged in a plurality of layers of different density.

British Patant Specification No. 1,326,192 discloses a method of manufacturing an article in thermoplastic material by confining heat-expandable beads of the material within a mould and then heating the beads so as to expand and fuse them together, wherein at least some of the beads are pre-expanded to reduce the density thereof, and the beads are deposited in the mould in a plurality of layers, each layer overlying the preceding layer and each layer being formed of beads at a density varying progressively from the first layer to the final layer, so that the part of the article consisting of the layer having the greatest density is substantially stronger than the part of the article consisting of the layer having the smallest density. The different layers are arranged so that the part of the article formed by the layer of beads having the highest density is the part which in use is more heavily stressed or subjected to wear, the lower density beads in the remainder of the article providing a substantial saving of material compared to an article made entirely from the highest density beads. The progressive variation in density between the different layers ensures that there is no abrupt change in density which might create a line of weakness through the article.

A mould for moulding heat-expandable beads of thermoplastic material is generally provided with only one filler opening at the top of the mould and difficulty is sometimes experienced in distributing beads of different density in any desired pattern within the mould in accordance with the method of British Patent Specification No. 1,326,192. This is particularly the case in a mould in which the bottom wall of the mould directly below the filler opening is inclined to the horizontal since the beads falling onto the inclined wall are deflected towards one part only of the mould. Additional filler openings could of course be provided in different positions depending on the contour of the product to facilitate distribution of the beads of any particular density, but the provision of more than one filler opening is undesirable for reasons of cost and standardisation of equipment.

According to the present invention there is provided a method of manufacturing an article in thermoplastic material with the density of the material varying throughout the article, comprising distributing heat-expandable beads of the material in layers of different density in a mould, confining the beads within the mould, and then heating the beads so as to expand and fuse them together, characterised in that the beads are fed through a filler opening in the wall of the mould on to a deflector mounted inside the mould and arranged to separate the flow of beads into two or more streams and deflect the streams in different directions towards different parts of the mould, and varying the average density of the beads fed through the filler opening during the filling operation to provide the desired density pattern within the mould.

The deflector can conveniently comprise a baffle plate mounted on the bottom wall of the mould with an edge of the baffle plate extending upwards inside the mould and across the inlet opening. Such a plate would of course result in a recess in the article being moulded. The plate may however extend through a slot in the wall of the mould and be withdrawn therefrom after the mould has been filled, the slot then being sealed by a cover plate.

The method of the invention will now be described with reference to the accompanying drawing in which:

FIG. 1 is a cross section through a mould for a chair showing the desired distribution of light and heavy density beads of thermoplastic material.

Figure 2:
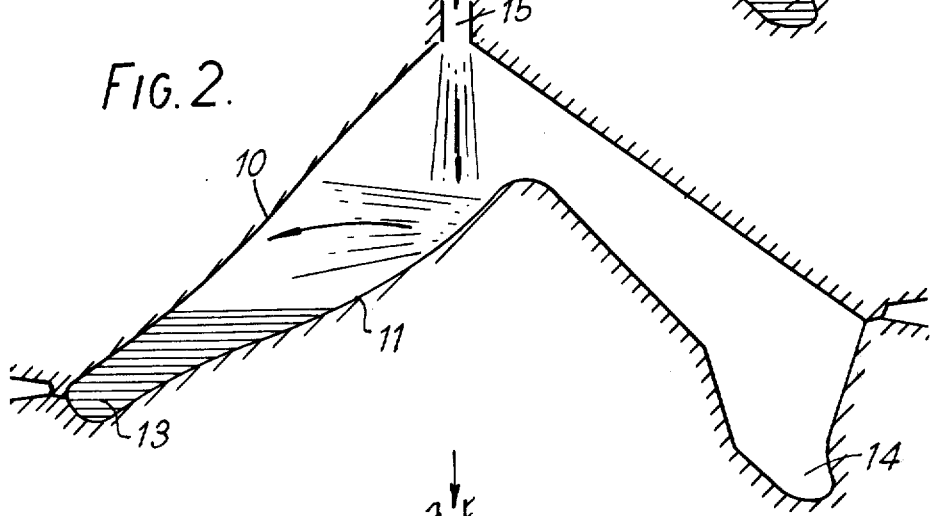
Figure 3:
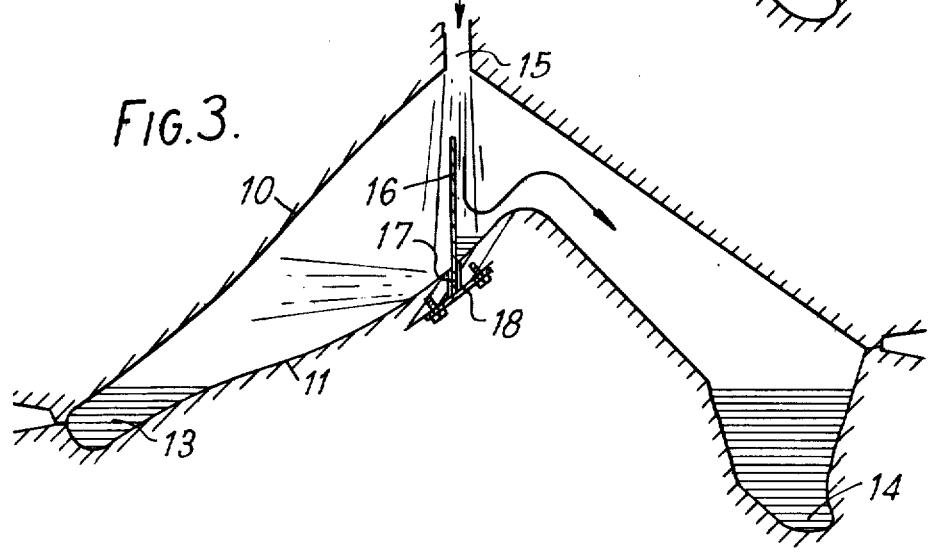
Figure 4:
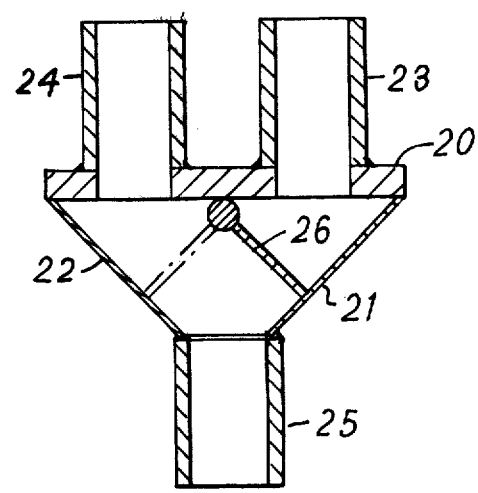

FIG. 2 is a cross section through the mould of FIG. 1 showing the path of flow of beads fed through the filler opening at the top of the mould, FIG. 3 is a cross section through the mould of FIG. 1 fitted with a deflector in accordance with the present invention and showing the paths of flow of beads fed through the filler opening, and FIG. 4 is a cross sectional view of a mixing device suitable for use in filling a mould with expandable beads of thermoplastic material in the performance of the invention.

The mould shown in FIG. 1 comprises an upper former 10 secured to a lower former 11 and co-operating therewith to define an internal cavity 12 having dimensions corresponding to that of a chair in an inverted position with the lower extremities 13, 14 of the mould defining the upper portion of the chair back and the front portion of the chair seat respectively. A filler opening 15 is provided at the top of the mould at the junction between the walls of the mould defining the rear of the chair back and the underside of the chair seat.

The mould of FIG. 1 is preferably filled with light and heavy density beads of thermoplastic material in accordance with the method of British Patent Specification No. 1,326,192 with the lower extremities 13, 14 of the mould filled with the heavy density beads, the upper portion of the mould filled with the light density beads, and a mixture of heavy and light density beads deposited in layers between the heavy density beads and the light density beads with the density of each layer varying progressively from the heavy density to the lower density. In FIG. 1 the heavy density beads are represented by closely spaced lines and the light density beads by widely spaced lines. When the mould filled with light and heavy density beads in accordance with this density pattern is subjected to heat, for example by placing the filled mould in a steam autoclave, the beads expand and fuse together to form a chair frame in which the front of the seat and the top of the back are formed of harder and stronger material than the remainder of the chair.

It will however be noted that, as is commonly the case with moulds for chairs having the filler opening at the junction of the chair back and the underside of the seat, the bottom wall of the mould directly below the filler opening is inclined to the horizontal so that beads fed into the mould through the filler opening strike the inclined wall and are deflected towards the lower extremity 13. The lower extremity 13 may thus be filled with heavy density beads and the part of the mould forming the remainder of the chair back filled with light density beads as in the pattern of bead distribution shown in FIG. 1. It is however difficult to fill the lower extremity 14 with heavy density beads since this can only be done by deflecting these beads off the pile of lighter density beads in the part of the mould forming the chair back and there is a risk that the light density beads will be displaced and fall into the lower extremity 14 of the mould.

In the mould shown in FIG. 3, a stainless steel baffle plate 16 extends through a slot 17 in the bottom wall of the mould directly below the inlet opening 15, the plate 16 projecting vertically upwards inside the mould towards the filler opening and extending across substantially the full width of the mould. The bottom of the baffle plate 16 is provided with a flange 18 which is bolted to the outside wall of the mould.

In the filling operation the mould of FIG. 3 is firstly supplied through the filler opening 15 with heavy density beads, which fall in a vertical stream into the mould cavity and are divided by baffle plate 16 into streams to the left and right of the baffle plate. The beads in the stream which strikes the inclined wall of lower former 11 to the left of the baffle plate are deflected toward the lower extremity 13, which is thereby filled with the heavy density beads. The beads in the stream striking the inclined wall to the right of the baffle plate initially collect in a pocket formed between the mould walls and the baffle plate. When the pocket has been filled with beads, further beads in the right hand stream are deflected towards lower extremity 14. The baffle plate 16 may be trial and error be deflected into a position which gives the required proportion of beads in the two streams for the correct distribution of heavy density beads in the extremities of the mould to be achieved. This can conveniently be a position in which the ratio of the volume rates of flow of the beads in the two streams is approximately equal to the ratio of the volumes of the lower extremities of the mould cavity so that the extremities fill up in approximately the same period of time. Once the correct quantity of heavy density beads has been distributed in the extremities of the mould, the average density of the beads flowing into the mould through the filler opening is progressively reduced by mixing light density beads with heavy density beads and gradually increasing the proportion of light density beads to heavy density beads so as to deposit, on the mass of heavy density beads already in the mould, successive layers of beads each having a density slightly less than the preceding layer. The proportion of heavy density beads is continually reduced until only light density beads are fed into the mould. The baffle plate 16 is then withdrawn through the slot 17, the remainder of the mould filled with the light density beads, the filler opening 15 and the slot 17 closed off and the filled mould heated in a stream autoclave to expand and fuse the beads.

A device suitable for mixing light density beads and heavy density beads of thermoplastic material and progressively varying the proportion of light and heavy beads in the mixture to provide a stream of beads for filling the mould is disclosed in FIG. 4. This mixing device comprises a housing 20 having two opposing side walls 21, 22 inclined downwards towards one another, two inlets 23, 24 on opposite sides of the top of the housing, an outlet 25 in the bottom of the housing, and a flap valve 26 pivotally mounted inside the housing about a transverse axis between the two inlets, the valve being movable between a first position shown in full lines in which it abuts against the wall 21 and closes inlet 23, and a second position shown in broken lines in which it abuts against the wall 22 and closes inlet 24. In use, the inlets 23, 24 are connected by conduits to separate hoppers, one of which contains dense beads and the other of which contains light beads, and the outlet 25 is connected by a flexible conduit to the filler opening 15 on the mould. In the first position of the flap valve, only the beads from the hopper connected to inlet 24 are supplied by gravity to the filler opening, and in the second position of the flap valve only the beads from the hopper connected to inlet 23 are supplied to the filler opening. At intermediate positions of the valve both the inlets 23, 24 are partially open, so that any desired proportion of dense and light beads may be fed to the outlet 25 by a suitable adjustment of the flap valve 26.

I claim:

1. In the manufacture of a shaped article from heat-expandable beads of thermoplastic material by pre-expanding the beads to different densities, mixing said beads of different densities in predetermined proportions to provide a mixture of beads of a specific average density, feeding said mixture of beads through a small filler opening in the top of the mould, varying the proportions of beads of different density fed through the filler opening so that the beads are deposited in layers of different average density in the mould, closing said filler opening, and then heating the beads to expand and fuse them together to form an article in which the density of the material varies within the article:

a method of distributing the mixture of beads to different parts of said mould comprising
1. inserting a deflector plate into the mould through a slot in the wall thereof separate from the filler opening,
2. feeding the mixture of beads in a continuous stream through said filler opening and on to an edge of the deflector plate, whereby the deflector plate separates the flow of beads into two or more streams and deflects the streams towards different parts of the mould,
3. withdrawing the deflector plate through said slot after said parts of the mould have been filled with beads, and
4. closing said slot prior to heating the beads in the mould.

2. A method as claimed in claim 1, comprising the steps of rigidly securing one end of the deflector plate to the wall of the mould and manually deforming the plate so as to vary the position of said edge in the stream of beads and thereby vary the distribution of beads in the mould.

3. A method of manufacturing the frame of a wing chair by the method as claimed in claim 1, characterised in that the mould is arranged with the cavity thereof corresponding to that of the chair in an inverted position with the lower extremities of the mould defining the upper portion of the chair back and the front portion of the chair seat respectively the filler opening being provided at the top of the mould at the junction between the walls of the mould defining the rear of the chair back and the underside of the chair seat, and the deflector comprises a baffle plate mounted on the wall of the mould below the filler opening and arranged to split the flow of beads entering the mould into two streams and direct one of the streams towards the part of the mould cavity defining the chair back and the other stream towards the part of the mould cavity defining the chair seat.

4. A method as claimed in claim 3, characterised in that the baffle plate is positioned so that the ratio of the volume rates of flow of the beads in the two streams is approximately equal to the ratio of the volumes of the two parts of the mould cavity defining the chair back and chair seat, whereby said two parts of the mould cavity fill up at approximately the same rate.

* * * * *